US009253346B2

(12) United States Patent
Furutani (10) Patent No.: US 9,253,346 B2
(45) Date of Patent: Feb. 2, 2016

(54) IMAGE PROCESSING APPARATUS, IMAGE FORMING APPARATUS, MOBILE TERMINAL APPARATUS, AND IMAGE PROCESSING SYSTEM

(71) Applicant: KYOCERA Document Solutions Inc., Osaka (JP)

(72) Inventor: Hiroshi Furutani, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/600,645

(22) Filed: Jan. 20, 2015

(65) Prior Publication Data

US 2015/0215475 A1    Jul. 30, 2015

(30) Foreign Application Priority Data

Jan. 29, 2014    (JP) .................................. 2014-014408

(51) Int. Cl.
*H04N 1/04* (2006.01)
*H04N 1/00* (2006.01)
*H04N 1/387* (2006.01)

(52) U.S. Cl.
CPC ......... *H04N 1/0044* (2013.01); *H04N 1/00307* (2013.01); *H04N 1/00381* (2013.01); *H04N 1/00392* (2013.01); *H04N 1/00411* (2013.01); *H04N 1/387* (2013.01); *H04N 1/3877* (2013.01); *H04N 2201/0081* (2013.01); *H04N 2201/0094* (2013.01)

(58) Field of Classification Search
CPC ............ H04N 1/0044; H04N 1/00307; H04N 1/3877; H04N 1/387; H04N 1/00411; H04N 1/00392; H04N 1/00381
USPC .......................................... 358/1.15, 1.9, 474
See application file for complete search history.

(56) References Cited

U.S. PATENT DOCUMENTS 7,239,414 B2 * 7/2007 Takamine ......... H04L 29/06027
358/1.15
2011/0312380 A1 * 12/2011 Bard .................. H04N 1/00307
455/557

FOREIGN PATENT DOCUMENTS

JP        2004-282439 A    10/2004

* cited by examiner

*Primary Examiner* — Houshang Safaipour
(74) *Attorney, Agent, or Firm* — Stein IP, LLC (57) ABSTRACT

An image processing apparatus includes an image reading portion, a storage apparatus, a transmitting portion, a receiving portion, and an image processing portion. The transmitting portion transmits an image read by the image reading portion to an external mobile terminal apparatus as a display destination of the image. The receiving portion receives a movement amount and rotation amount of the image which the mobile terminal apparatus decides based on a user operation. The image processing portion applies, to the image, a movement process in accordance with the movement amount received by the receiving portion and a rotation process in accordance with the rotation amount received by the receiving portion, and makes the storage apparatus store the image after the processing.

5 Claims, 12 Drawing Sheets

IMAGE PROCESSING APPARATUS, IMAGE FORMING APPARATUS, MOBILE TERMINAL APPARATUS, AND IMAGE PROCESSING SYSTEM

INCORPORATION BY REFERENCE

This application is based on and claims the benefit of priority from Japanese Patent Application No. 2014-014408 filed on Jan. 29, 2014, the contents of which are hereby incorporated by reference.

BACKGROUND OF THE INVENTION

The present disclosure relates to an image processing apparatus, an image forming apparatus, a mobile terminal apparatus, and an image processing system, more particularly, to a technology that corrects an image read by an image reading portion.

An image forming apparatus has a function (preview function) that displays a read image as a preview image for a user in a case where image forming of the image read by an image reading portion is performed. The user confirms the preview image before the image forming is performed and thereby can avoid an event where an image obliquely read and the like undergoes the image forming.

However, in the above image forming apparatus, in the case where the image obliquely read and the like is displayed as the preview image, it is necessary to set again the document on the image forming apparatus and read the image.

Another conventional image forming apparatus includes a display panel that has a touch panel function, displays a read document as a preview image on the display panel, and can execute correction of the image on the preview image by using the touch panel function. In this way, even in the case where an image obliquely read and the like is displayed as a preview image, it is possible to release the user from the burden of setting again the document, reading and correcting the image.

SUMMARY OF THE INVENTION

An image processing apparatus according to an aspect of the present disclosure includes an image reading portion, a storage apparatus, a transmitting portion, a receiving portion, and an image processing portion. The transmitting portion transmits an image read by the image reading portion to an external mobile terminal apparatus as a display destination of the image. The receiving portion receives a movement amount and rotation amount of the image which the mobile terminal apparatus decides based on a user operation. The image processing portion applies, to the image, a movement process in accordance with the movement amount received by the receiving portion and a rotation process in accordance with the rotation amount received by the receiving portion, and makes the storage apparatus store the image after the processes.

Besides, an image forming apparatus according to another aspect of the present disclosure includes the above image processing apparatus and an image forming portion. The image forming portion forms an image to which the image processing portion applies the movement process and the rotation process.

Besides, a mobile terminal apparatus according to another aspect of the present disclosure includes a receiving portion, a display portion, an operation accepting portion, a display control portion, and a transmitting portion. The receiving portion receives an image read by an external image processing apparatus. The display portion displays the image received by the receiving portion. The operation accepting portion accepts a user operation which issues a command indicating movement and rotation of the image. Based on the user operation accepted by the operation accepting portion, the display control portion moves and rotates the image, and makes the display portion display the image. The transmitting portion transmits, to the image processing apparatus, a movement amount by which the display control portion moves the image and a rotation amount by which the display control portion rotates the image.

Besides, an image processing system according to another aspect of the present disclosure includes an image processing apparatus, and a mobile terminal apparatus that is able to communicate with the image processing apparatus. The image processing apparatus includes an image reading portion, a storage apparatus, a first transmitting portion, a first receiving portion, and an image processing portion. The first transmitting portion transmits an image read by the image reading portion to the mobile terminal apparatus as a display destination of the image. The first receiving portion receives a movement amount and rotation amount of the image which the mobile terminal apparatus decides based on a user operation. The image processing portion applies, to the image, a movement process in accordance with the movement amount received by the first receiving portion and a rotation process in accordance with the rotation amount received by the first receiving portion, and makes the storage apparatus store the image after the processes. The mobile terminal apparatus includes a second receiving portion, a display portion, an operation accepting portion, a display control portion, and a second transmitting portion. The second receiving portion receives the image read by the image processing apparatus. The display portion displays the image received by the second receiving portion. The operation accepting portion accepts the user operation which issues a command indicating movement and rotation of the image. Based on the user operation accepted by the operation accepting portion, the display control portion moves and rotates the image, and makes the display portion display the image. The second transmitting portion transmits, to the image processing apparatus, a movement amount by which the display control portion moves the image and a rotation amount by which the display control portion rotates the image.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
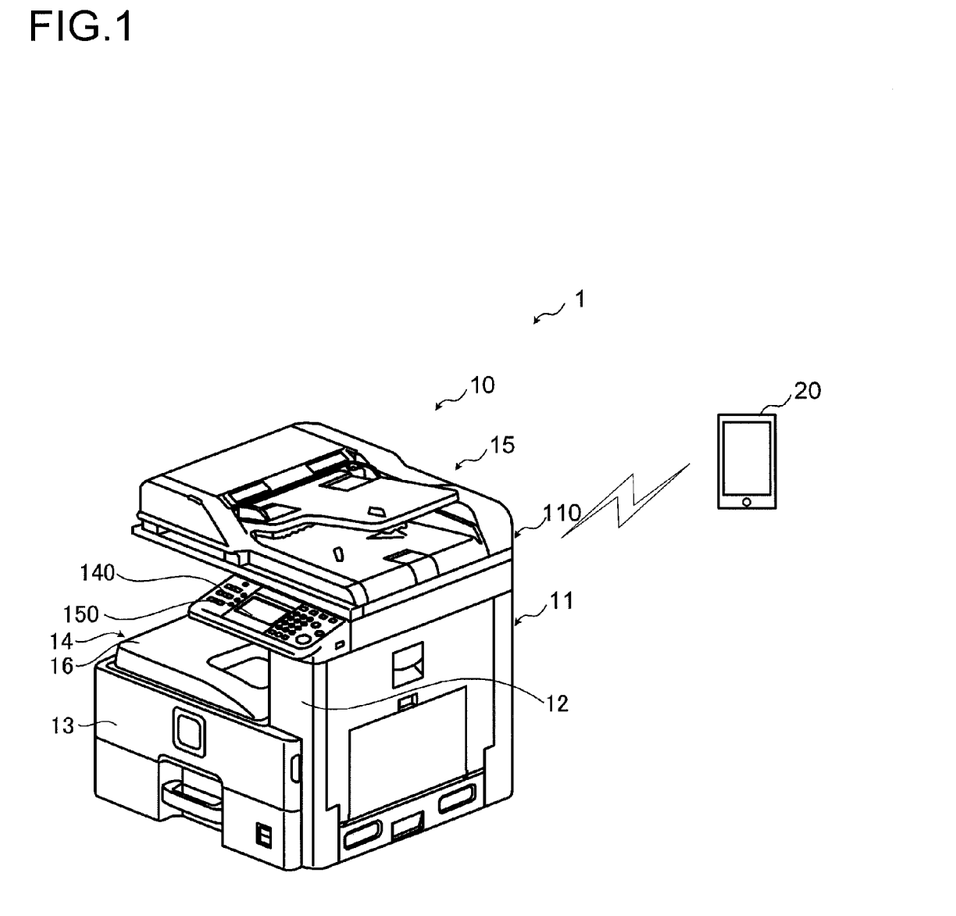
FIG. 1 is a perspective view showing a structure of an image forming system according to an embodiment of the present disclosure.
Figure 2:
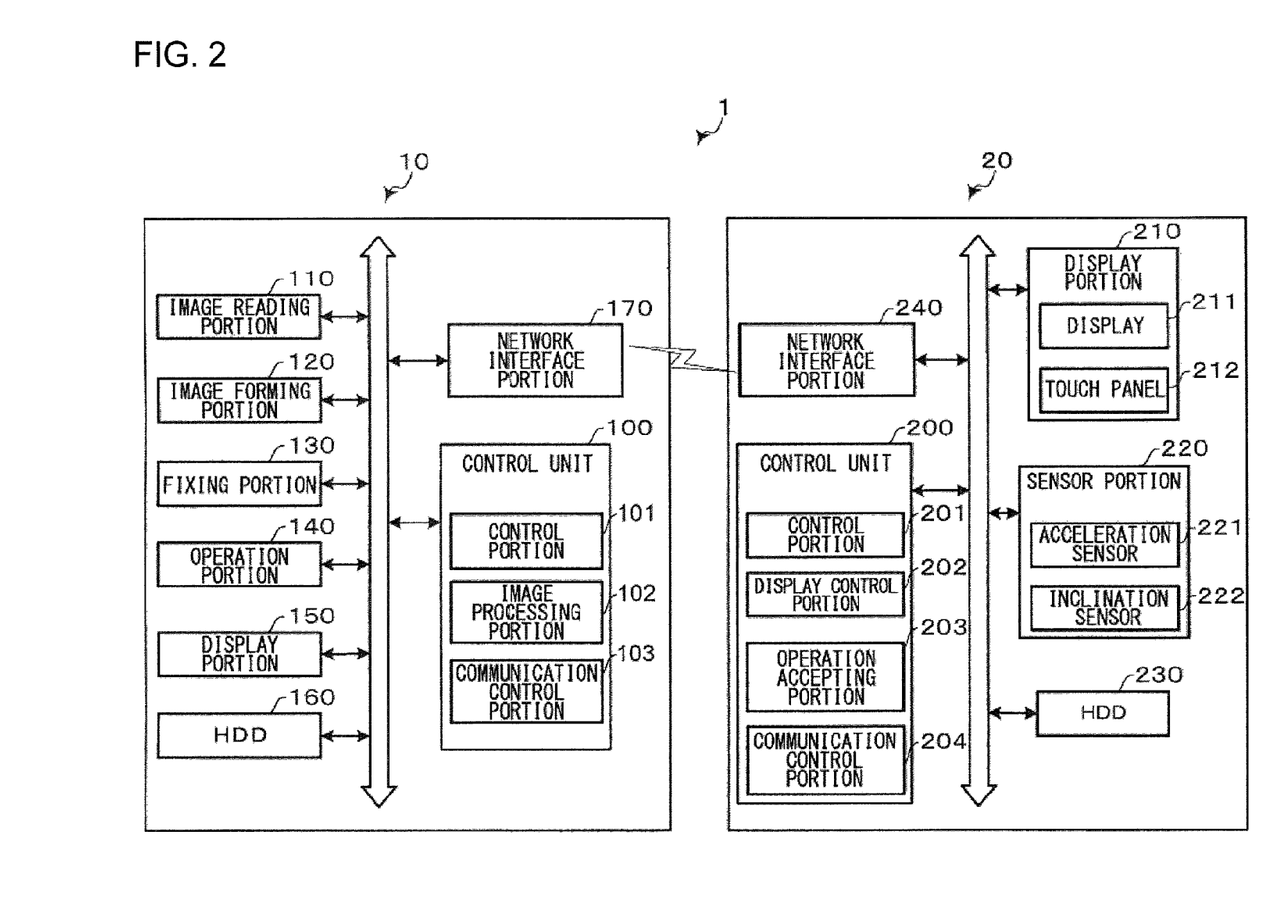
FIG. 2 is a block diagram showing an internal structure of an image forming system according to an embodiment of the present disclosure.

Hereinafter, an image processing apparatus, an image forming apparatus, a mobile terminal apparatus, and an image processing system according to an embodiment of the present disclosure are described with reference to the drawings. FIG. 1 is a perspective view showing a structure of an image forming system as an example of the image processing system according to the embodiment of the present disclosure. FIG. 2 is a block diagram showing an internal structure of the image forming system according to the embodiment of the present disclosure.

The image forming system 1 includes an image forming apparatus 10 as an example of the image processing apparatus, and a mobile terminal apparatus 20 that is able to communicate with the image forming apparatus 10. First, a structure of the image forming apparatus 10 is described.

The image forming apparatus 10 is a multi-functional machine that includes a plurality of functions such as, for example, a copy function, a printer function, a scanner function, a facsimile function and the like. The image forming apparatus 10 is roughly composed of an apparatus main body 11, an image reading portion 110 that is disposed over the apparatus main body 11 to oppose the apparatus main body 11, and a connecting portion 12 that is disposed between the image reading portion 110 and the apparatus main body 11.

The apparatus main body 11 is composed to include an image forming portion 120, a fixing portion 130, a paper sheet feeding portion 13, a paper sheet delivery portion 14 and the like.

In a case where the image forming apparatus 10 performs an image reading operation, the image reading portion 110 reads optically a document conveyed from a document conveyance portion 15 or a document placed on a not-shown contact glass to generate an image. The image generated by the image reading portion 110 is stored into an incorporated HDD (Hard disk drive) 160, thereafter, transmitted to the mobile terminal apparatus 20.

In a case where the image forming apparatus 10 performs an image forming operation, based on the image generated by the above image reading operation or an image to which a movement process and a rotation process are applied by an image processing portion 102 of a control unit 100 described later, the image forming portion 120 forms a toner image onto a recording paper sheet fed from the paper sheet feeding portion 13. Thereafter, the toner image formed on the recording paper sheet is thermally fixed by the fixing portion 130. The recording paper sheet, on which the fixing process and the image forming are completed, is delivered to a delivery tray 16.

A front surface of the image forming apparatus 10 is provided with an operation portion 140 and a display portion 150. The display portion 150 is composed to include a liquid crystal display (LCD) or an organic EL (OLED: Organic Light-Emitting Diode) display, and displays a menu screen and the like that accept setting relevant to image reading and image forming.

The operation portion 140 includes, for example, a menu key for calling the menu screen, an arrow key for moving a focus of a GUI which composes the menu screen, a decision key for performing a decision operation on the GUI which composes the menu screen, a letter input key for performing letter inputting, a numerical input key for performing numerical inputting and the like, and accepts, from a user, an operation to be applied to the menu screen displayed on the display portion 150.

A network interface portion 170 is composed of a communication module such as a wireless LAN board or the like. The network interface portion 170 is controlled by a communication control portion 103 described later.

The image forming apparatus 10 further includes the control unit 100. The control unit 100 is composed of a CPU (Central Processing Unit), a RAM, a ROM and the like. An image forming program stored in the above ROM or HDD 160 is executed by the above CPU, so that the control unit 100 functions as a control portion 101, the image processing portion 102, and the communication control portion 103. In the meantime, the control portion 101, image processing portion 102, and communication control portion 103 of the control unit 100 may not operate based on the image forming program, but may each be composed of a hardware circuit.

The control portion 101 is responsible for comprehensive operation control of the image forming apparatus 10. The control portion 101 is connected to the image reading portion 110, the image forming portion 120, the fixing portion 130, the operation portion 140, the display portion 150, the HDD 160, the network interface portion 170 and the like. The control portion 101 performs operation control of each of the above connected mechanisms, and transmission/reception of a signal or data with each mechanism.

The communication control portion 103 controls the network interface portion 170 to perform transmission/reception of data with the mobile terminal apparatus 20 and the like. Specifically, the communication control portion 103 functions: as a transmitting portion that transmits an image read by the image reading portion 110 to the mobile terminal apparatus 20 as a display destination of the image; and as a receiving portion that receives a movement amount and rotation amount of an image transmitted from the mobile terminal apparatus 20. Here, the movement amount and rotation amount of the image are values that the mobile terminal apparatus 20 decides based on a user operation, and the image forming apparatus 10 corrects the image read by the image reading portion 110 based on the values. Details of this are described later.

The image processing portion 102 applies, to the image read by the image reading portion 110, a movement process in accordance with the movement amount received by the communication control portion 103 and a rotation process in accordance with the rotation amount received by the communication control portion 103. Here, the movement process is a process to move a position of each pixel composing an image in a horizontal direction (X direction) and a vertical direction (Y direction). Besides, the rotation process is a process to rotate a position of each pixel composing an image. In the above movement process and rotation process, a position of each pixel composing an image is moved; accordingly, a lost region (a pixel does not exist) occurs on an image after the processes. The image processing portion 102 inserts, for example, a white image into the region where the pixel is lost. Thereafter, the image, to which the above movement process and rotation process are applied by the image processing portion 102, is stored into the HDD 160, and the image forming is performed by the image forming portion 120.

Next, a structure of the mobile terminal apparatus 20 is described. The mobile terminal apparatus 20 is a mobile terminal device such as a smart phone or the like, and includes a control unit 200, a display portion 210, a sensor portion 220, a HDD 230, a network interface portion 240 and the like.

The network interface portion 240 is composed of a communication module such as a wireless LAN chip or the like. The network interface portion 240 is controlled by a communication control portion 204 described later.

The display portion 210 has a display 211 and a touch panel 212. The display 211 is composed of a liquid crystal display, an organic EL display or the like, and displays the image read by the image reading portion 110 of the image forming apparatus 10 as a preview image under control by a display control portion 202 described later. The image read by the image reading portion 110 is transmitted from the image forming apparatus 10 and received via the network interface portion 240. In the meantime, the display 211 is a display that has higher brightness, higher resolution, and higher response speed than a display of the display portion 150 incorporated in the image forming apparatus 10.

The touch panel 212 is, for example, a touch panel of electrostatic capacity type that can detect a multi-touch, and is disposed on a front surface of a display screen portion of the display 211. The touch panel 212 detects a contact by a user on the display screen of the display 211 together with the contact position (coordinate position). Upon detecting the contact by the user, the touch panel 212 outputs a detection signal indicating the contact position to an operation accepting portion 203 of the control unit 200 described later and the like. In the meantime, the touch panel 212 may be a touch panel that detects a finger of the user and the like in a case where the finger approaches a predetermined distance from the display screen even if the finger does not touch the display screen. Because of this, the "contact" here in the present embodiment includes a state, in which a finger or the like approaching the above predetermined distance is detected by the function of the touch panel 212 even if there is not a contact with the display screen, as a virtual contact.

Figure 3:
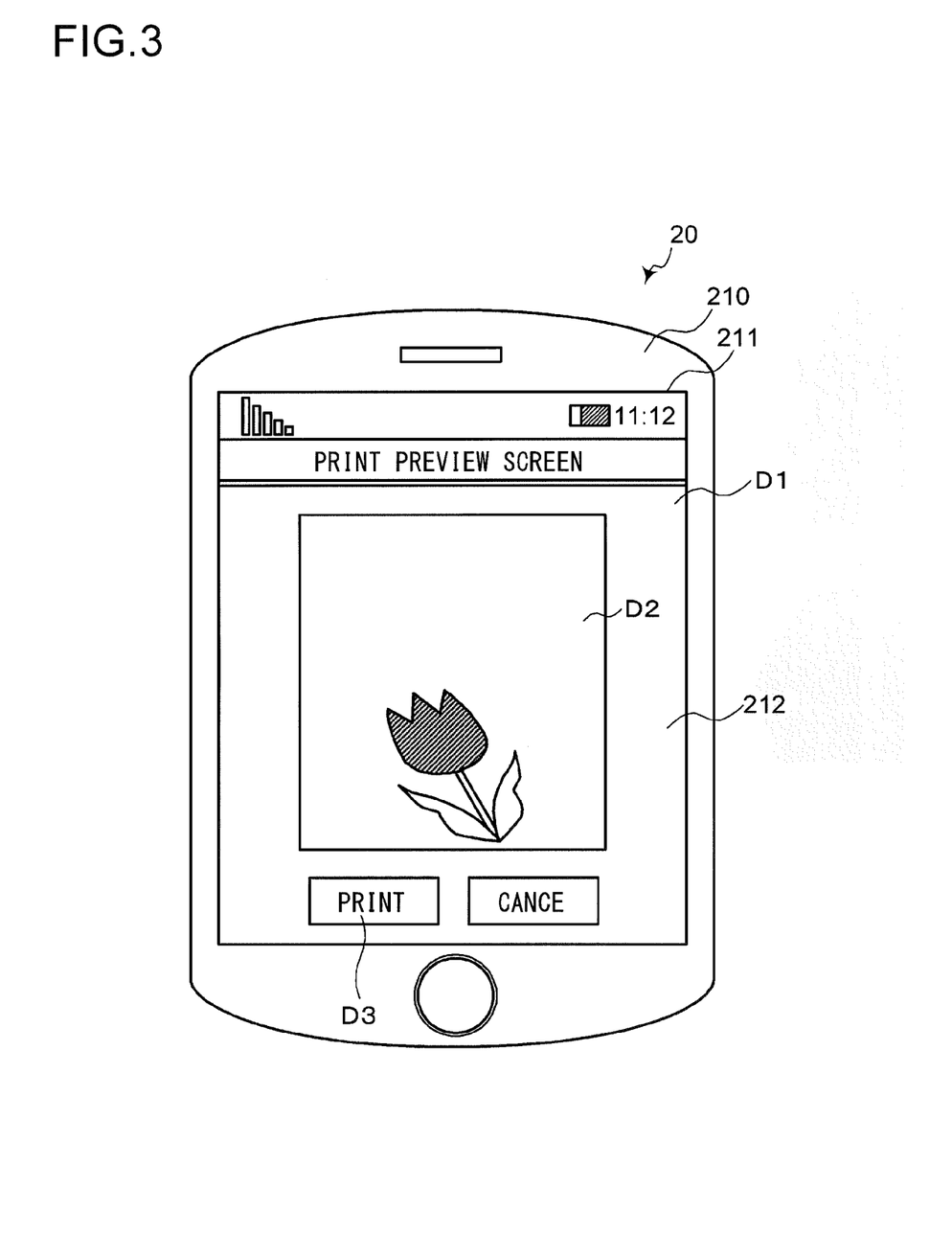
FIG. 3 is a view showing an example of a preview screen that is displayed on a display portion of a mobile terminal apparatus according to an embodiment of the present disclosure.

FIG. 3 is a view showing an example of the preview screen that is displayed on the display portion 210. In the example shown in FIG. 3, a preview screen D1 is displayed on the display 211. As to the preview screen D1, an image D2 read by the image reading portion 110 is displayed as a preview image on the display 211. Although details are described later, the image D2 is corrected based on a gesture operation that uses a touch panel function of the touch panel 212. Besides, the preview screen D1 is provided with a "print" button D3. If the user selects the button D3 by using the touch panel function of the touch panel 212, a command for printing (image forming) is accepted by the operation accepting portion 203 of the control unit 200 described later.

The sensor portion 220 has an acceleration sensor 221 and an inclination sensor 222. The acceleration sensor 221 is, for example, an acceleration sensor of electrostatic capacity detection type, detects a change in capacity formed by a movable electrode and a fixed electrode and thereby detects an acceleration of the mobile terminal apparatus 20. Upon detecting the acceleration of the mobile terminal apparatus 20, the acceleration sensor 221 outputs a detection signal indicating the acceleration to the display control portion 202, operation accepting portion 203 and the like of the control unit 200 described later.

The inclination sensor 222 is, for example, an inclination sensor of vibration type, vibrates a detection element to detect an angular velocity based on Coriolis force acting on the detection element, and detects, from the angular velocity, an inclination by which the mobile terminal apparatus 20 is inclined to a horizontal surface. Upon detecting the inclination of the mobile terminal apparatus 20, the inclination sensor 222 outputs a detection signal indicating the inclination to the display control portion 202, operation accepting portion 203 and the like of the control unit 200 described later.

The HDD 230 is a large-capacity storage apparatus, and stores various data such as an image and the like transmitted from the image forming apparatus 10.

The control unit 200 is composed of a CPU, a RAM, a ROM and the like. A control program stored in the above ROM or HDD 230 is executed by the above CPU, so that the control unit 200 functions as the control portion 201, the display control portion 202, the operation accepting portion 203, and the communication control portion 204. In the meantime, the control portion 201, display control portion 202, operation accepting portion 203, and communication control portion 103 of the control unit 200 may not operate based on the above control program, but may each be composed of a hardware circuit.

The control portion 201 is responsible for comprehensive operation control of the mobile terminal apparatus 20. The control portion 201 is connected to the display portion 210, the sensor portion 220, the HDD 230, the network interface portion 240 and the like. The control portion 201 performs operation control of each of the above connected mechanisms, and transmission/reception of a signal or data with each mechanism.

The communication control portion 204 controls the network interface portion 240 to perform transmission/reception of data with the image forming apparatus 10. Specifically, the communication control portion 204 functions: as a receiving portion that receives an image read by the image forming apparatus 10; and as a transmitting portion that transmits a movement amount and rotation amount of an image, which is decided based on a user operation, to the image forming apparatus 10.

Based on the detection signal output from the touch panel 212, the operation accepting portion 203 confirms a user operation input by the user. And, the operation accepting portion 203 accepts the confirmed user operation, and outputs a control signal corresponding to the user operation to the control portion 201, display control portion 202 and the like of the control unit 200.

Here, the user operation includes a swipe operation, a tap operation, a pinch operation, a rotation operation and the like. For example, if the user slides a finger on the display screen of the display portion 210 with the finger contacting the display screen, detection signals, which indicate respective movement positions from the initial position where the contact is detected for the first time to the final position where the contact is detected lastly, are output from the touch panel 212 to the operation accepting portion 203. The operation accepting portion 203 confirms from the above detection signals output from the touch panel 212 that the user operation input by the operator is a swipe operation. And, the operation accepting portion 203 outputs a control signal corresponding to the swipe operation to the control portion 201, the display control portion 202 and the like.

The display control portion 202 has a function that controls a display operation of the display portion 210 based on the user operation accepted by the operation accepting portion 203. For example, in a case where the operation accepting portion 203 accepts a swipe operation, the display control portion 202 moves an image displayed on the display portion 210 in accordance with the swipe operation. At this time, the display control portion 202 moves a position of each pixel composing the image in a horizontal direction and a vertical direction by an amount based on an operation speed and the like of the swipe operation accepted by the operation accepting portion 203. And, the display control portion 202 stores the movement amount by which the image is moved.

Besides, in a case where the operation accepting portion 203 accepts a rotation operation, the display control portion 202 rotates an image displayed on the display portion 210 in accordance with the rotation operation. At this time, the display control portion 202 rotates a position of each pixel composing the image by an amount based on a rotation amount and the like of the rotation operation accepted by the operation accepting portion 203. And, the display control portion 202 stores the rotation amount by which the image is rotated. When a command for the image forming is accepted, the movement amount and rotation amount stored in the above display control portion 202 are transmitted together with the command for the image forming to the image forming apparatus 10 by the communication control portion 204.

Figure 4:
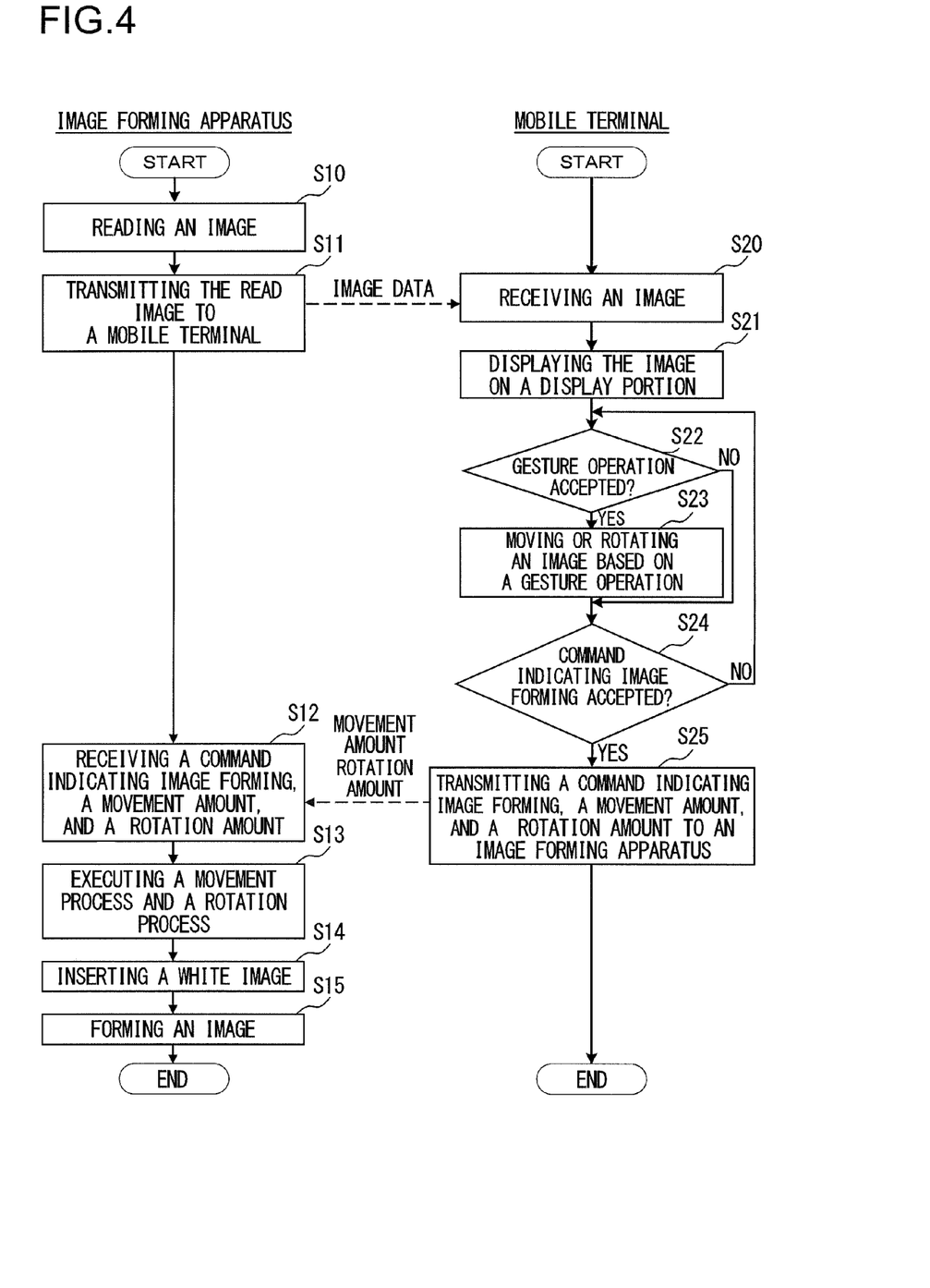
FIG. 4 is a flow chart showing a flow of an image forming operation of an image forming system according to an embodiment of the present disclosure.

Next, operation of the image forming system 1 having the above structure is described. FIG. 4 is a flow chart showing a flow of an image forming operation of the image forming system 1.

As shown in FIG. 4, the image reading portion 110 of the image forming apparatus 10 reads optically a document or the like placed on the contact glass to generate an image (step S10).

After reading the image, the communication control portion 103 transmits the read image to the mobile terminal apparatus 20 as a display destination via the network interface portion 170 (step S11).

The communication control portion 204 of the mobile terminal apparatus 20 receives the image transmitted from the image forming apparatus 10 via the network interface portion 240 (step S20). And, the display control portion 202 makes the display portion 210 display the received image as a preview image (step S21).

In the state where the received image is displayed as the preview image on the display portion 210, the operation accepting portion 203 confirms a user operation input by the user based on a detection signal output from the touch panel 212 (step S22). In a case where the operation accepting portion 203 accepts a scroll operation or a rotation operation from the detection signal output from the touch panel 212 (YES in the step S22), the display control portion 202 moves or rotates the image displayed on the display portion 210 based on the gesture operation (step S23). At this time, the display control portion 202 stores a movement amount by which the image is moved and a rotation amount by which the image is rotated.

Figure 5A:
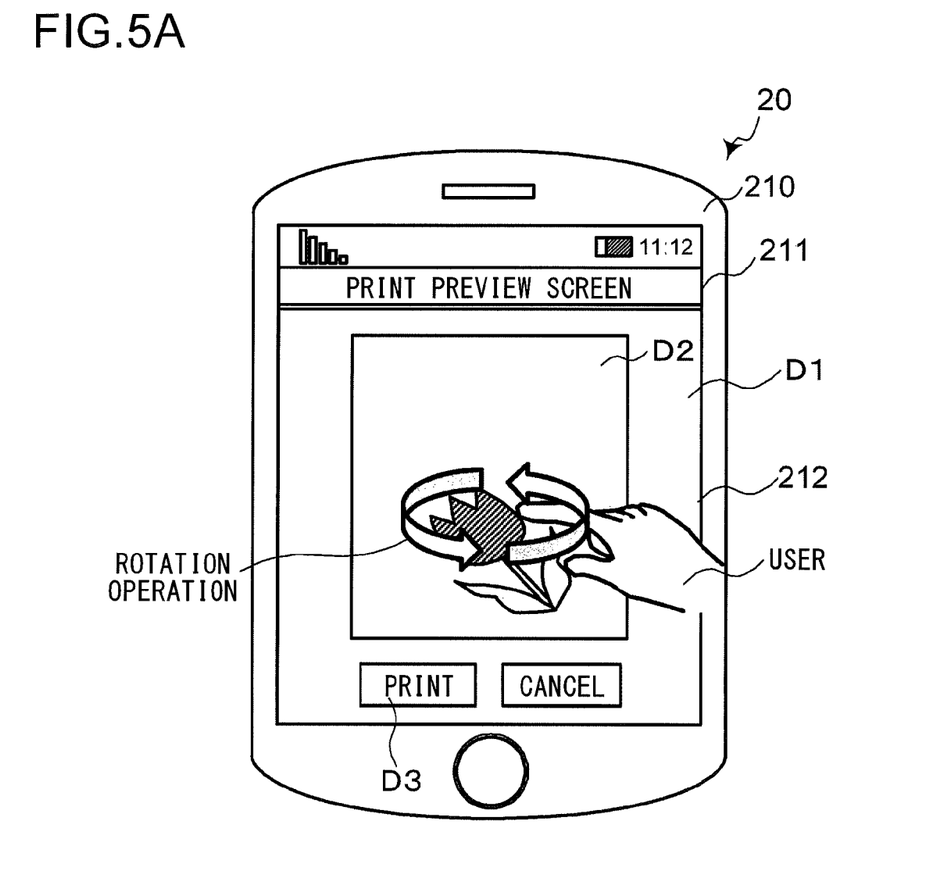
FIG. 5A and FIG. 5B are views showing an example of an image corrected by a rotation operation by a user.
Figure 5B:
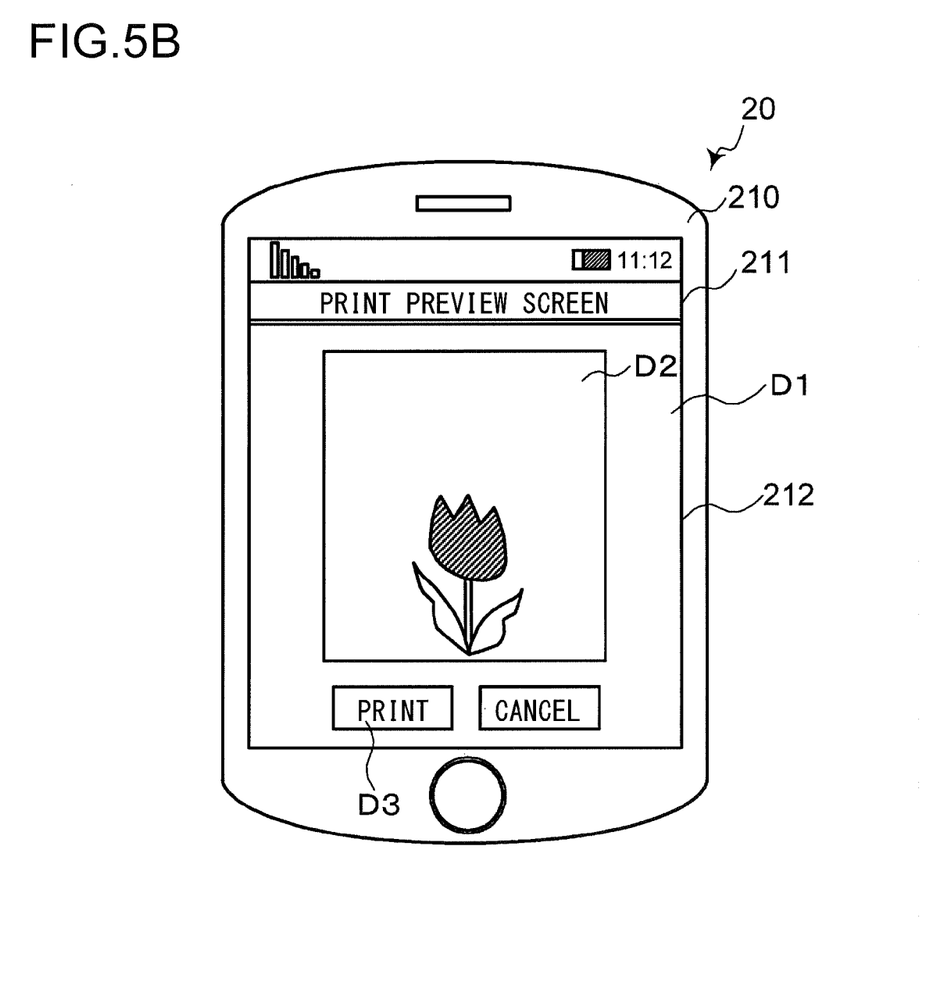
Figure 6A:
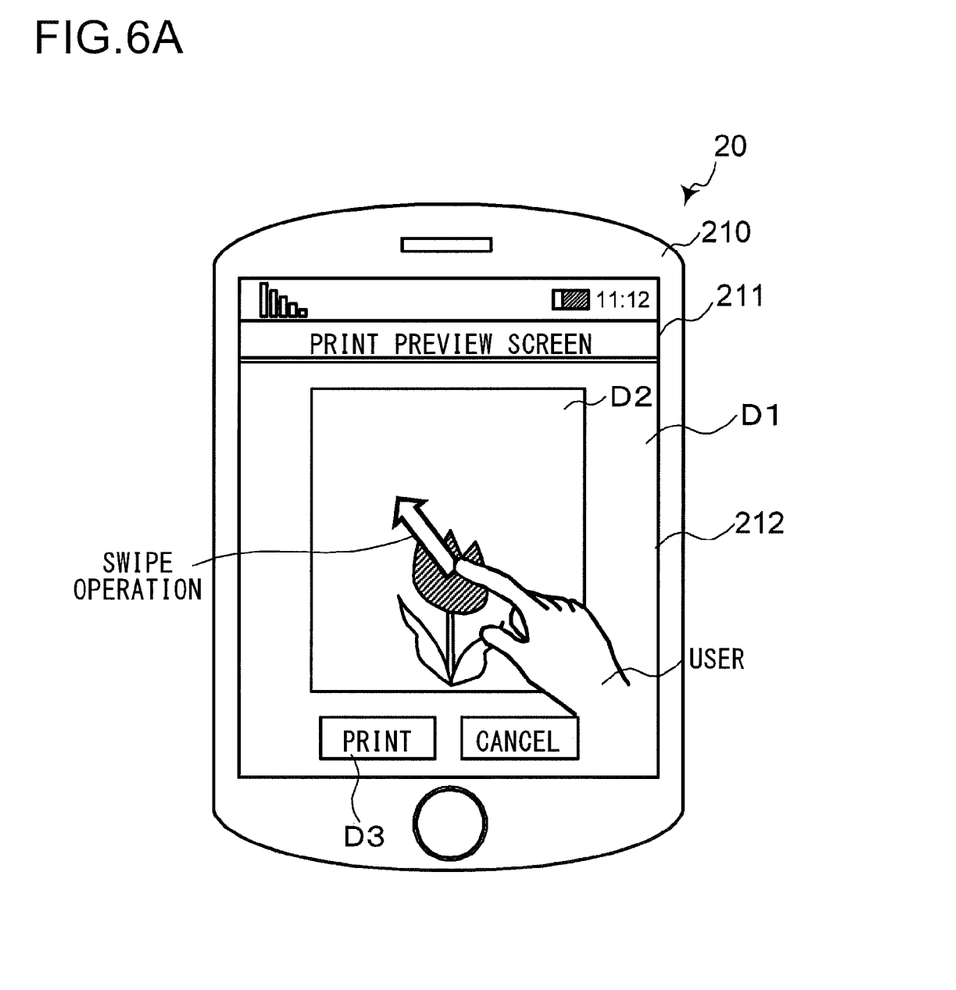
FIG. 6A and FIG. 6B are views showing an example of an image corrected by a swipe operation by a user.
Figure 6B:
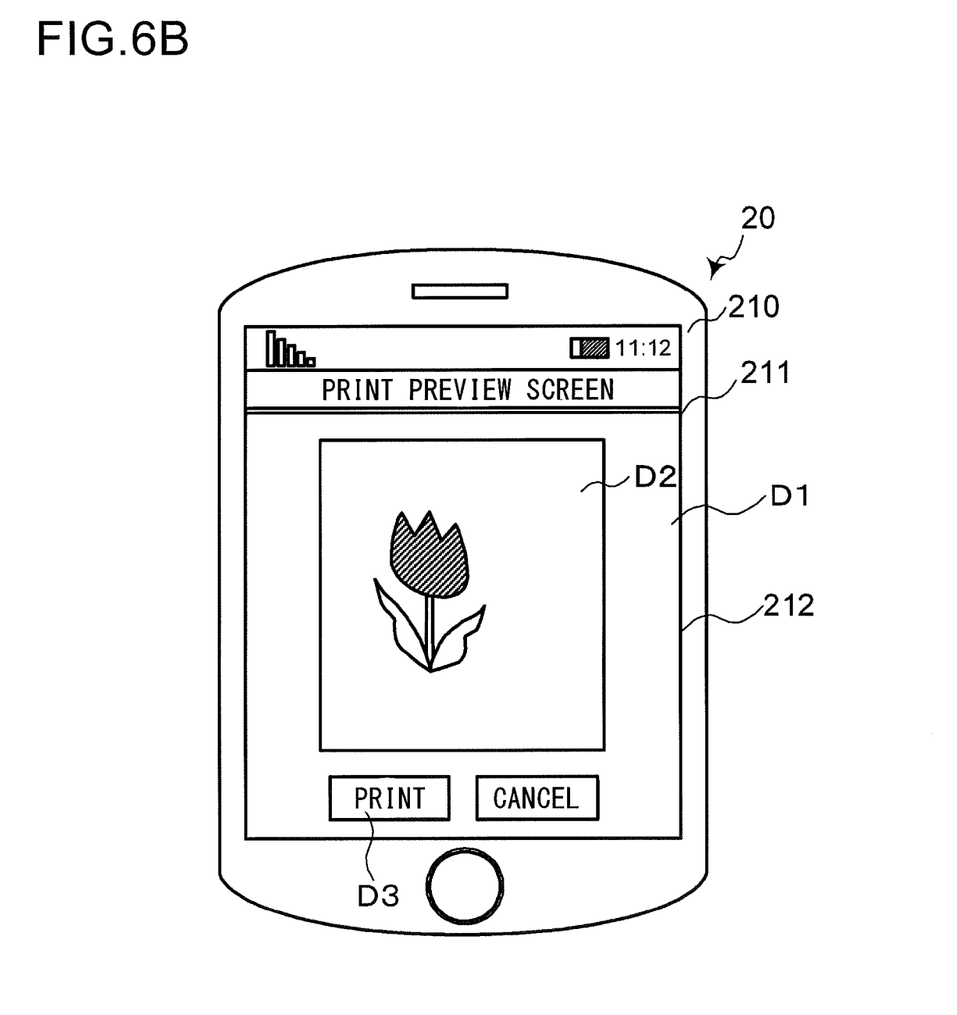

The processes in the above step S22 and step S23 are described by using specific examples. FIG. 5A and FIG. 5B are views showing an example of an image corrected by a rotation operation by the user. FIG. 6A and FIG. 6B are views showing an example of an image corrected by a swipe operation by the user.

In the example shown in FIG. 5A, a document is placed in an inclined state on the contact glass, and the reading by the image reading portion 110 is performed in the state; accordingly, a flower image is obliquely displayed as the image D2 on the display portion 210. In this state, in a case where a rotation operation is input by the user and the operation accepting portion 203 accepts the rotation operation, the display control portion 202 rotates the image displayed on the display portion 210 in accordance with the rotation operation (see FIG. 5B). As described above, even in the case where an image is read in an inclined state, it is possible to change the image in a desired direction by means of a straightforward operation.

Besides, in the example shown in FIG. 6A, a document is placed in a deviated state on the contact glass, and the reading by the image reading portion 110 is performed in the state; accordingly, a flower image is displayed with deviated from a center as the image D2 on the display portion 210. In this state, in a case where a swipe operation is input by the user and the operation accepting portion 203 accepts the swipe operation, the display control portion 202 moves the image displayed on the display portion 210 in accordance with the swipe operation (see FIG. 6B). As described above, even in the case where an image is read in a deviated state, it is possible to change the image to a desired position by means of a straightforward operation.

Back to FIG. 4, after the movement and rotation processes of the image in the above step S22 and step S23, the operation accepting portion 203 determines whether a command indicating the image forming is accepted or not (step S24). In the examples shown in FIG. 5A, FIG. 5B, FIG. 6A, and FIG. 6B, if the user selects the button D3 by using the touch panel function of the touch panel 212 after the gesture operation by the user, the command indicating the image forming is accepted by the operation accepting portion 203.

In the case where the command indicating the image forming is accepted (YES in the step S24), the communication control portion 204 transmits the movement amount and rotation amount of the image stored by the display control portion 202 to the image forming apparatus 10 together with the command indicating the image forming (step S25).

The communication control portion 103 of the image forming apparatus 10 receives the command indicating the image forming, the movement amount and rotation amount of the image transmitted from the mobile terminal apparatus 20 (step S12). And, the image processing portion 102 applies a movement process in accordance with the received movement amount and a rotation process in accordance with the received rotation amount to the image which is read by the image reading portion 110 and stored in the HDD 160 (step S13).

After the step S13, the image processing portion 102 inserts a white image into a region where pixels are lost because a position of each pixel composing the image is moved and rotated in the movement process and the rotation process (step S14).

The control portion 101 controls the image forming portion 120 to execute an image forming process of the image that is corrected in the step S13 and the step S14 (step S15).

As described above, according to the image forming system 1 of the present embodiment, even in a case where an image or the like read obliquely is displayed as a preview image, it is possible to correct the image by means of the mobile terminal apparatus 20; accordingly, it is unnecessary to set again the document on the image forming apparatus to read the image.

Besides, according to the image forming system 1 of the present embodiment, an image read by the image reading portion 110 is not displayed on a display panel that is incorporated in an image forming apparatus, usually small and has a low resolution, but transmitted to the external mobile terminal apparatus 20 and displayed as a preview image by means of the mobile terminal apparatus 20. The display 211 incorporated in the mobile terminal apparatus 20 is a display that has usually higher brightness, higher resolution, and higher response speed than a display incorporated in an image forming apparatus, and is excellent in visibility of the preview image. Besides, the touch panel 212 incorporated in the mobile terminal apparatus 20 has higher sensitivity than a touch panel incorporated in a general image forming apparatus, and is excellent in operability of correcting an image. Further, in the mobile terminal apparatus 20, it is possible to correct an image by means of the gesture operation that uses the touch panel function, and it is possible to correct an image by means of a user operation straightforward and excellent in operability and to perform the image forming.

In the meantime, the present disclosure is not limited to the above embodiment, but can be modified variously. For example, the above embodiment represents a mobile device such as a smart phone or the like as an embodiment of the mobile terminal apparatus according to the present disclosure, but the present disclosure is not limited to this case. Besides mobile devices such as a smart phone and the like, the present disclosure is applicable to, for example, devices such as a personal computer and the like that have a display portion.

Besides, in the above embodiment, the case is described, in which the image displayed on the display portion 210 of the mobile terminal apparatus 20 is corrected by means of the gesture operation that uses the touch panel functions of the touch panel 212 such as the swipe operation and the rotation operation. However, the present disclosure is not limited to this case. For example, the image displayed on the display portion 210 of the mobile terminal apparatus 20 may be corrected by means of an operation that inclines the mobile terminal apparatus 20 or an operation that moves the mobile terminal apparatus 20 in an up-down direction or a left-right direction.

Figure 7A:
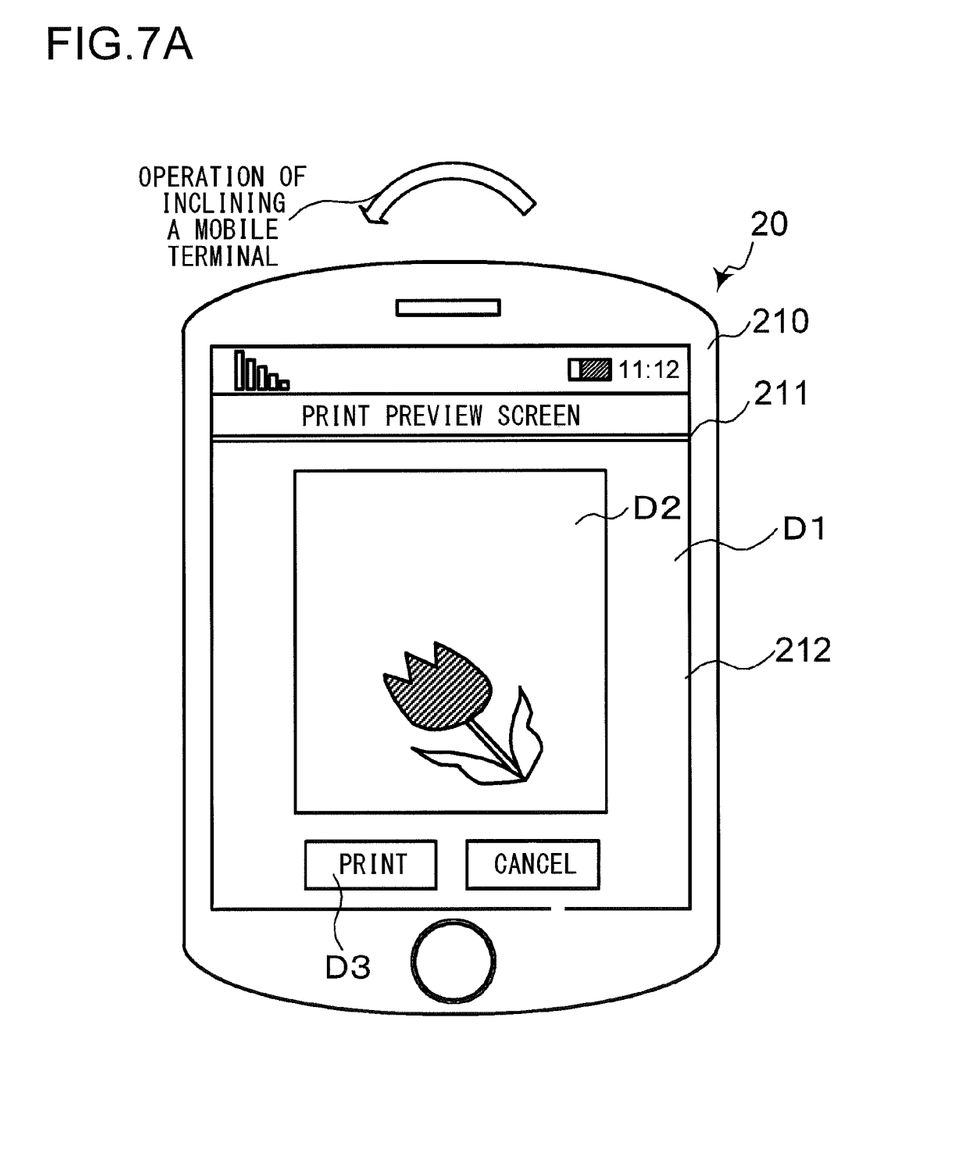
FIG. 7A and FIG. 7B are views showing an example of an image corrected by an operation of inclining a mobile terminal apparatus.
Figure 7B:
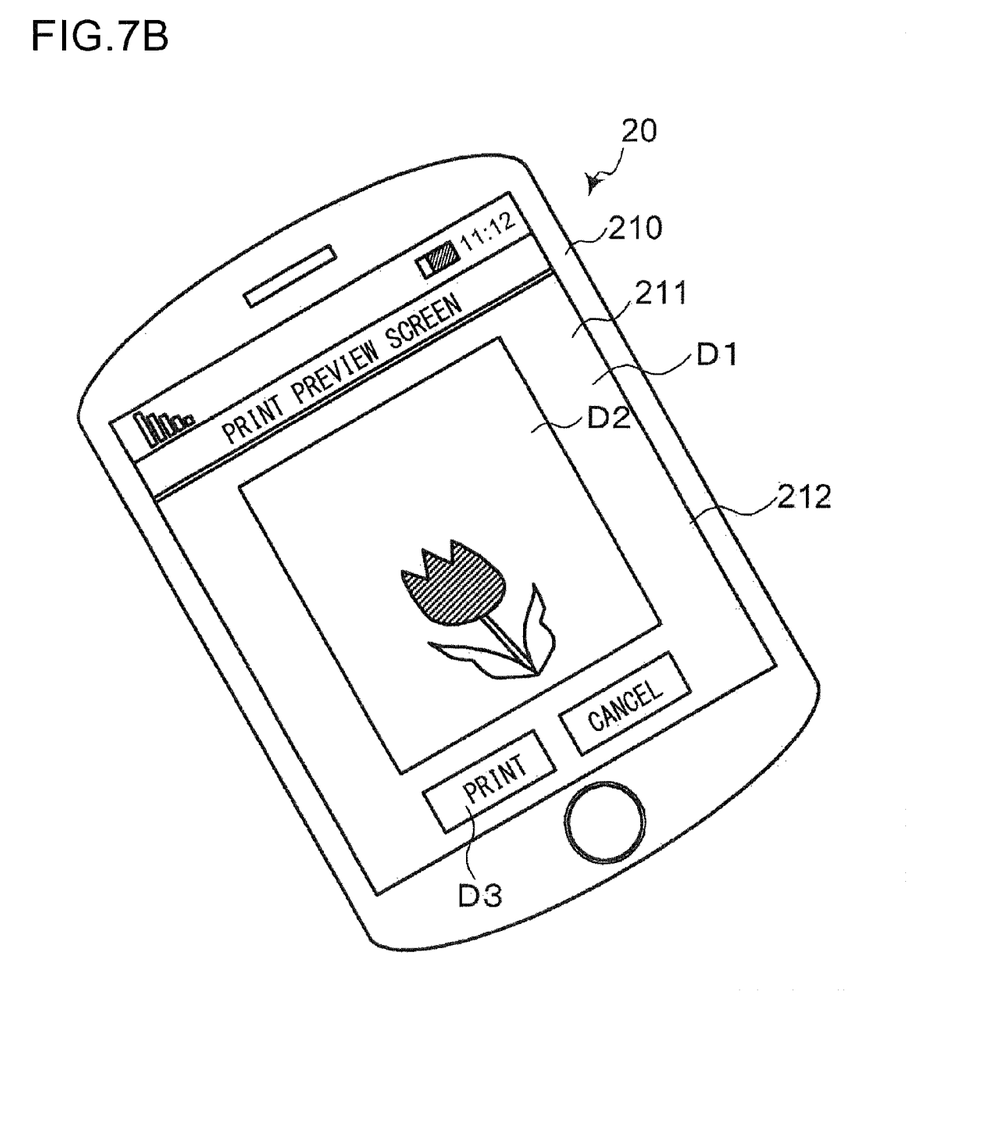
Figure 8A:
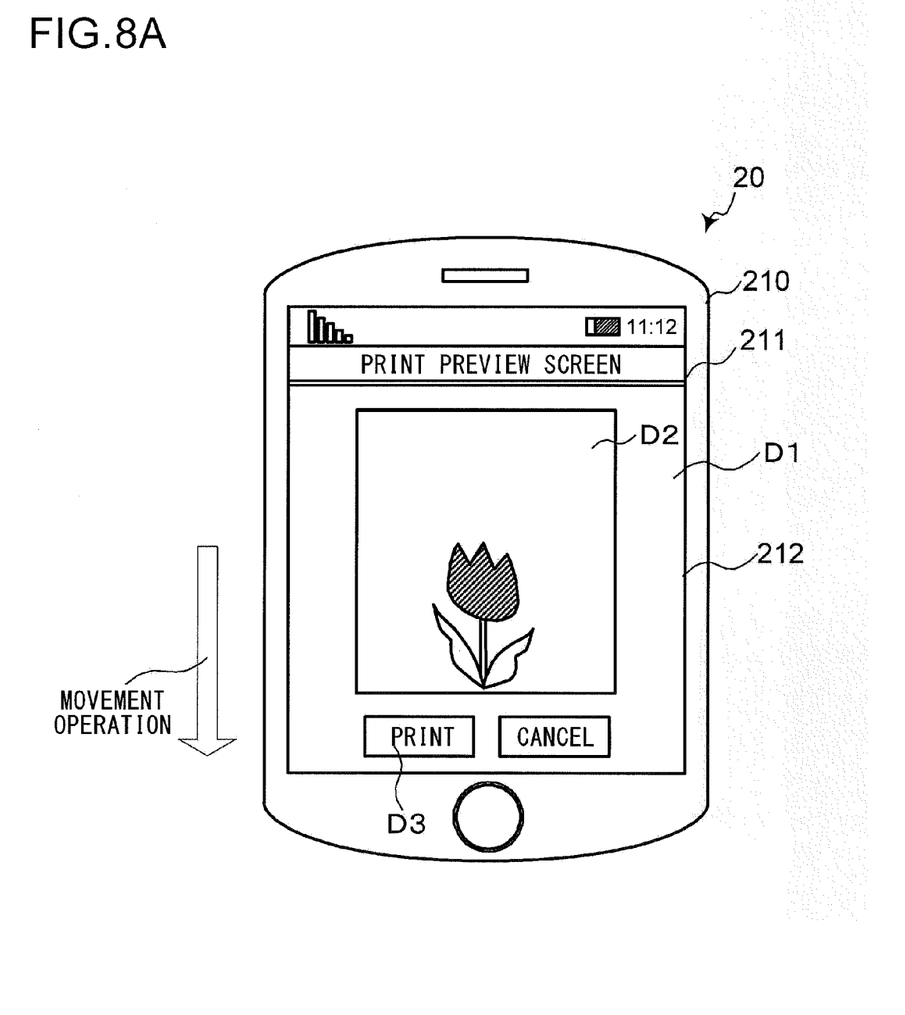
FIG. 8A and FIG. 8B are views showing an example of an image corrected by an operation of moving a mobile terminal apparatus.
Figure 8B:
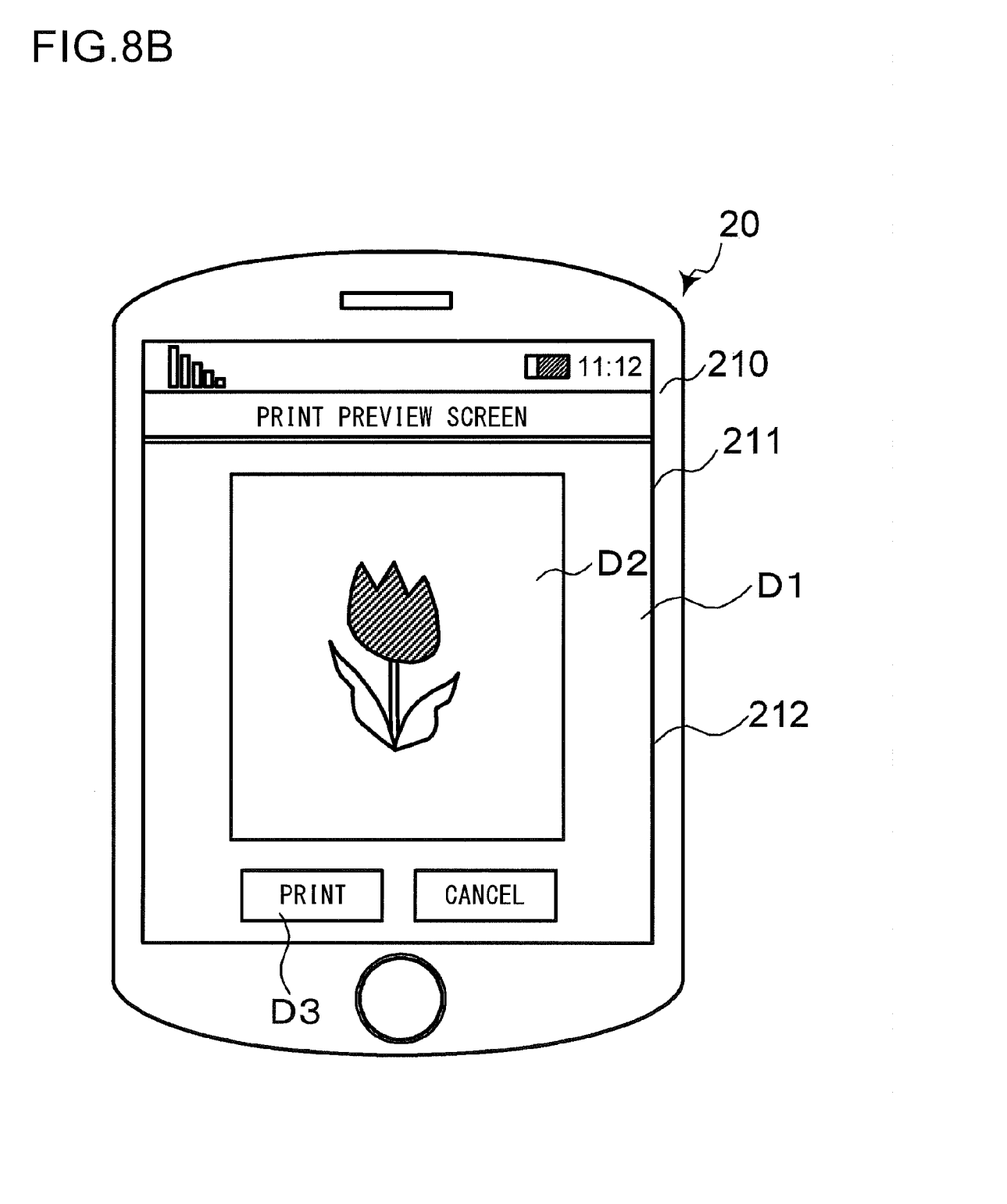

FIG. 7A and FIG. 7B are views showing an example of an image corrected by an operation of inclining the mobile terminal apparatus 20. FIG. 8A and FIG. 8B are views showing an example of an image corrected by an operation of moving the mobile terminal apparatus 20.

In the example shown in FIG. 7A, a document is placed in an inclined state on the contact glass, and the reading by the image reading portion 110 is performed in the state; accordingly, a flower image is obliquely displayed as the image D2 on the display portion 210.

In this state, if the mobile terminal apparatus 20 is inclined by the user, the inclination of the mobile terminal apparatus 20 is detected by the inclination sensor 222, and a detection signal indicating the inclination is output to the operation accepting portion 203. In a case where the operation accepting portion 203 accepts the operation for inclining the mobile terminal apparatus 20, the display control portion 202 rotates the image displayed on the display portion 210 in accordance with the inclination operation (see FIG. 7B). Specifically, the display control portion 202 rotates a position of each pixel composing the image by an angle corresponding to the inclination angle in a direction opposite to a direction in which the mobile terminal apparatus 20 is inclined.

Besides, in the example shown in FIG. 8A, a document is placed in a deviated state on the contact glass, and the reading by the image reading portion 110 is performed in the state; accordingly, a flower image is displayed with deviated from the center as the image D2 on the display portion 210. In this state, if the mobile terminal apparatus 20 is moved by the user, the movement of the mobile terminal apparatus 20 is detected by the acceleration sensor 221, and a detection signal indicating the movement is output to the operation accepting portion 203. In a case where the operation accepting portion 203 accepts the operation for moving the mobile terminal apparatus 20, the display control portion 202 moves the image displayed on the display portion 210 in accordance with the movement operation (see FIG. 8B). Specifically, the display control portion 202 moves a position of each pixel composing the image by an amount corresponding to the movement amount in a direction opposite to a direction in which the mobile terminal apparatus 20 is moved.

As described above, in the above modifications, it is possible to correct the image by means of the straightforward user operation and perform the image forming in the same way as in the case where the image is corrected by means of the gesture operation that uses the touch panel function of the touch panel 212.

What is claimed is:

1. An image processing apparatus comprising:
an image reading portion;
a storage apparatus;
a transmitting portion that transmits an image read by the image reading portion to an external mobile terminal apparatus as a display destination of the image;
a receiving portion that receives a movement amount and rotation amount of the image which the mobile terminal apparatus decides based on a user operation; and
an image processing portion that applies, to the image, a movement process in accordance with the movement amount received by the receiving portion and a rotation process in accordance with the rotation amount received by the receiving portion, and makes the storage apparatus store the image after the processings,
wherein the image processing portion performs a process to insert a white image into a lost region that occurs as a result of performing the movement process and the rotation process.

2. An image forming apparatus comprising:
an image processing apparatus according to claim 1; and
an image forming portion that forms an image to which the image processing portion applies the movement process and the rotation process.

3. A mobile terminal apparatus comprising:
a receiving portion that receives an image read by an external image processing apparatus;
a display portion that displays the image received by the receiving portion;
an operation accepting portion that accepts a user operation which issues a command indicating movement and rotation of the image;
a display control portion that based on the user operation accepted by the operation accepting portion, moves and rotates the image, and makes the display portion display the image;
a transmitting portion that transmits, to the image processing apparatus, a movement amount by which the display control portion moves the image and a rotation amount by which the display control portion rotates the image; and
a sensor that detects movement and attitude of the mobile terminal apparatus,
wherein the operation accepting portion accepts a user operation based on the movement and attitude of the mobile terminal apparatus detected by the sensor, and
the display control portion moves the image in accordance with the movement of the mobile terminal apparatus, rotates the image in accordance with the attitude of the mobile terminal apparatus, and makes the display portion display the image.

4. The mobile terminal apparatus according to claim 3, wherein
the display portion has a touch panel function, the operation accepting portion accepts a gesture operation that uses the touch panel function; and based on the gesture operation accepted by the operation accepting portion, the display control portion moves and rotates the image, and makes the display portion display the image.

5. An image processing system comprising:

an image processing apparatus;

a mobile terminal apparatus that is able to communicate with the image processing apparatus, wherein the image processing apparatus includes:

an image reading portion, a storage apparatus, a first transmitting portion that transmits an image read by the image reading portion to the mobile terminal apparatus as a display destination of the image, a first receiving portion that receives a movement amount and rotation amount of the image which the mobile terminal apparatus decides based on a user operation, and an image processing portion that applies, to the image, a movement process in accordance with the movement amount received by the first receiving portion and a rotation process in accordance with the rotation amount received by the first receiving portion, and makes the storage apparatus store the image after the processes, the mobile terminal apparatus includes:

a second receiving portion that receives the image read by the image processing apparatus;

a display portion that displays the image received by the second receiving portion;

an operation accepting portion that accepts the user operation which issues a command indicating movement and rotation of the image;

a display control portion that based on the user operation accepted by the operation accepting portion, moves and rotates the image, and makes the display portion display the image; and a second transmitting portion that transmits, to the image processing apparatus, a movement amount by which the display control portion moves the image and a rotation amount by which the display control portion rotates the image.

* * * * *